July 10, 1962
W. M. NICHOLS
3,043,094
EXHAUST MANIFOLDS
Filed Feb. 29, 1960
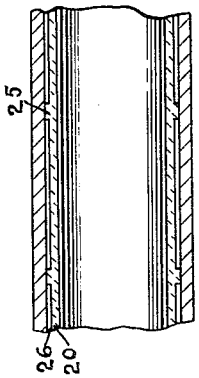
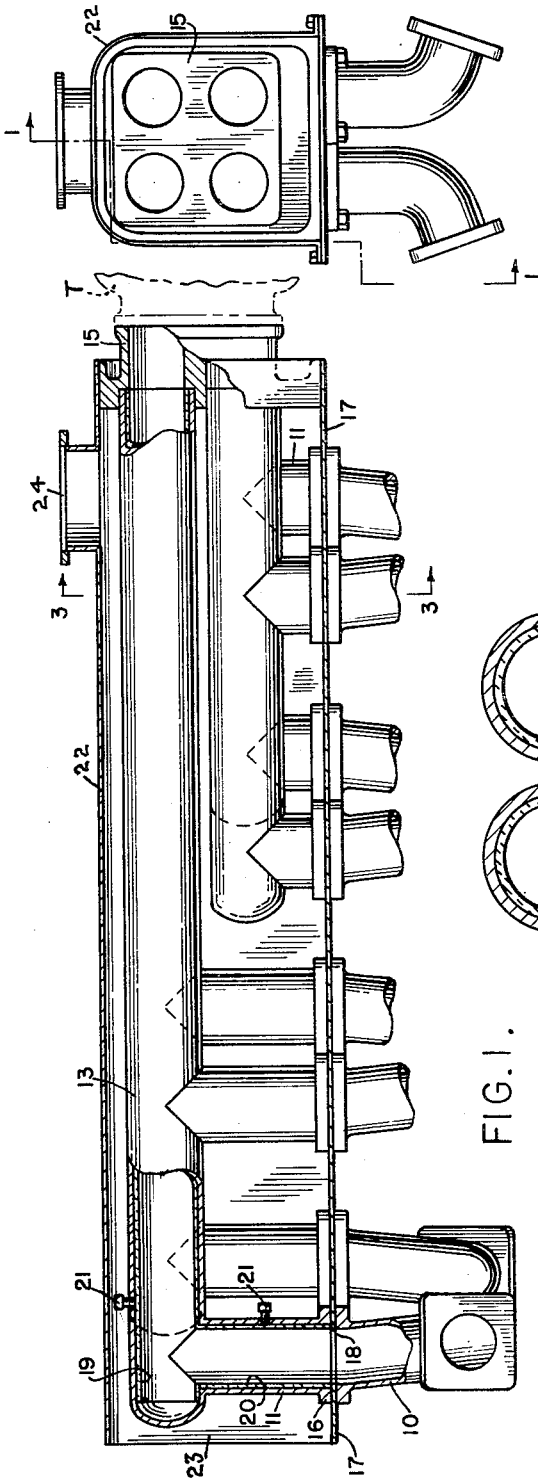
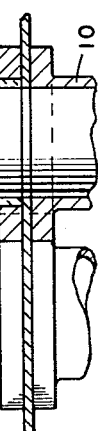
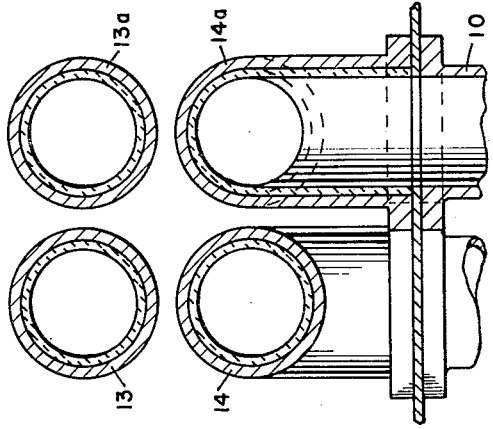
WILLIAM M. NICHOLS
*INVENTOR.*
BY *Maurice W Grady*
ATTORNEY United States Patent Office 3,043,094
Patented July 10, 1962

3,043,094
EXHAUST MANIFOLDS
William M. Nichols, Schenectady, N.Y., assignor to Alco Products, Incorporated, New York, N.Y., a corporation of New York
Filed Feb. 29, 1960, Ser. No. 11,664
1 Claim. (Cl. 60—29)

This invention relates to exhaust manifolds for internal combustion engines.

In the operation of turbo-supercharged diesel engines of the type used in locomotives, the intense heat of the exhaust gases causes warping, buckling, and other forms of distortion in the exhaust manifold. Such manifolds are of considerable length which, in large engines, is in the order of 10 to 12 feet. Manifolds of such length, if the main and branch pipes are of unitary construction, become misaligned with respect to the exhaust ports due to thermal expansion. Furthermore, there is frequently cracking of the pipes, particularly at the joints; and the escaping gases are annoying and hazardous to the health of the operating crew.

To provide flexible couplings as a solution to the problem has been found to be impractical since the materials required to withstand the heavy duty incident to such constructions are too expensive for competitive use. To cool the manifold is likewise impractical because the consequent drop in the heat of the exhaust gas diminishes its effectiveness in driving the turbocharger. Manifolds having a main conduit consisting of aligned pipe sections arranged in slip joint relation have been widely used but have not been entirely satisfactory since the joints sometimes seize. This causes warping or even cracking of the pipes. In addition, there is always some leakage present in the jointed type of manifold which is of course highly objectionable.

The principal object of this invention, therefore, is to provide thermal control means for the exhaust manifold of an internal combustion engine thus limiting the thermal expansion of the manifold so that relative thermal expansion between the manifold and the engine is minimized or eliminated.

Another object is to provide an exhaust manifold having a liner of heat resistant insulating material to maintain the manifold at a relatively low temperature thus limiting its thermal expansion so that relative thermal movement between the manifold and the engine will be minimized or eliminated.

A still further object is to provide an exhaust manifold having its main and branch pipes lined with heat resistant insulating material to minimize the thermal stresses and strains in the joints between the pipe elements.

A further object is to provide in a conduit or the like subject to thermal expansion, a heat resistant insulating liner to minimize thermal expansion of the conduit.

Other and further objects of the present invention will be apparent from the following description, the accompanying drawings, and the appended claim.

In the drawings:

FIG. 1 is a plan view partially in section of the manifold of the present invention;

FIG. 2 is an end view of FIG. 1;

FIG. 3 is a cross sectional view taken on line 3—3 of FIG. 1; and

FIG. 4 is a preferred arrangement of the liners in the main pipes.

Referring now to the drawings, the illustrative embodiment of the invention is shown applied to the exhaust manifold of an eight cylinder V-type engine, although it is not intended that the application be limited to such an engine. Inlet branches 10, flanged for securement to the engine (not shown), conduct the exhaust of the engine cylinders to a multiple pipe system comprising risers 11, an upper pair of horizontally arranged parallel main pipes 13 and 13a and a lower pair of horizontally arranged parallel main pipes 14 and 14a. Each of the branches 10 supplies a riser 11. It can be seen from FIG. 1 that four of the risers 11 are connected to the upper pair of main pipes and four to the lower pair. At the turbocharger end of the manifold (the right end in FIG. 1), a coupling member 15 is provided for the reception of the four main pipes, the coupling being flanged for connection to the turbocharger T. Each main pipe extends from the turbocharger along the top of the engine only the distance necessary for connection to that riser feeding into it which is most remote from the turbocharger. For example, pipe 14 extends from coupling member 15 to the fourth riser counting from the coupling; pipe 13a extends to the seventh riser and so on. The lower end of each riser 11 is flanged at 16 for attachment to base plate 17 which extends longitudinally the full length of the manifold assembly. Plate 17 is formed with two sets of aligned holes 18 to permit the passage of exhaust into the risers from the branches which are also attached to the plate.

Disposed within each of the longitudinal main pipes 13, 13a, 14 and 14a is a cylindrical liner 19 of heat resistant insulating material so dimensioned that it fits snugly therein. Adjacent the joint between each pipe and riser, a V-shaped cut out is formed in each main pipe liner 19 to form a joint wtih the mating end of an insulating liner 20 disposed within each of the risers 11. Set screws or other conventional means 21 are provided to hold the liners in proper position in the pipes and risers. It should be noted that the inside diameter of liner 20 is the same as the diameter of holes 18 and the inside diameter of branches 10 to provide a continuous surface for the flow of exhaust gases therethrough. The liners 19 and 20 may be formed of a refractory such as a pyroceramic material. Such material as now produced is capable of withstanding the high heat of the exhaust gases and is adaptable for machining.

Attached to plate 17 is a covering jacket 22 extending the length of the manifold assembly and is provided with an opening 23 at its rear end and an opening 24 on the top thereof adjacent the turbocharger. Air may be circulated through the jacket around the pipe assembly to conduct away the heat of the pipes to maintain them at a relatively low temperature.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claim are contemplated as a part of this invention.

A preferred arrangement of the insulating liner or sleeve is shown in FIG. 4. In this construction, ribs 25 are provided on the outer periphery of the insulating liner 20. These ribs may be spaced apart along the length of the liner or may be in the form of a continuous spiral rib. When inserted into a main pipe of an exhaust manifold, the ribs 25 contact the inner surface of the pipe to support the liner and provide an insulating air space 26 defined by the main pipe, the liner and the ribs. This air space further insulates the main pipes from the heat of the exhaust gases to minimize or eliminate expansion.

What I claim is:

An exhaust manifold having a main conduit and a plurality of branch pipes adapted for securement to the cylinders of an internal combustion engine to conduct the exhaust gases therefrom; insulating ceramic liner means disposed within the conduit; said liner means having a close fit with the inside surface of the conduit and having openings therein adjacent each branch pipe; insulating ceramic liner means disposed in each branch pipe, said branch pipe liner means having a close fit with the inside surface of the pipe and having an end portion mating with the opening in the main conduit liner means.

References Cited in the file of this patent

UNITED STATES PATENTS

| | | |
|---|---|---|
| 2,260,656 | Bell | Oct. 28, 1941 |
| 2,728,408 | Deliman | Dec. 27, 1955 |
| 2,825,421 | Bryant | Mar. 4, 1958 |
| 2,831,547 | Willsea | Apr. 22, 1958 |
| 2,858,667 | Reske | Nov. 4, 1958 |

FOREIGN PATENTS

| | | |
|---|---|---|
| 234,283 | Great Britain | May 28, 1925 |
| 673,277 | Great Britain | June 4, 1952 |